United States Patent [19]

Yashiro et al.

[11] Patent Number: 5,114,896

[45] Date of Patent: May 19, 1992

[54] PROCESS FOR THE PRODUCTION OF A CATALYTIC COMPONENT FOR THE POLYMERIZATION OF OLEFINS

[75] Inventors: Teruo Yashiro; Seizaburo Kanazawa; Akira Nakano; Masahide Murata; Masafumi Imai, all of Iruma, Japan

[73] Assignee: Tonen Corporation, Tokyo, Japan

[21] Appl. No.: 678,318

[22] PCT Filed: Aug. 27, 1990

[86] PCT No.: PCT/JP90/01085

§ 371 Date: Apr. 29, 1991

§ 102(e) Date: Apr. 29, 1991

[87] PCT Pub. No.: WO91/03501

PCT Pub. Date: Mar. 21, 1991

[30] Foreign Application Priority Data

Aug. 28, 1989 [JP] Japan ................... 1-218600

[51] Int. Cl.⁵ ............................................. C08F 4/654
[52] U.S. Cl. .................................. 502/111; 502/112; 502/115; 502/116; 502/121; 502/125; 502/128; 526/128
[58] Field of Search ............... 502/111, 112, 115, 116, 502/121, 125, 128

[56] References Cited

U.S. PATENT DOCUMENTS

| | | | |
|---|---|---|---|
| 4,814,311 | 3/1989 | Murata et al. | 502/111 |
| 4,814,312 | 3/1989 | Murata et al. | 502/111 |
| 4,814,313 | 3/1989 | Murata et al. | 502/111 |
| 4,950,630 | 8/1990 | Murata et al. | 502/116 |
| 4,960,743 | 10/1990 | Murata et al. | 502/121 |

*Primary Examiner*—Patrick P. Garvin
*Attorney, Agent, or Firm*—Wenderoth, Lind & Ponack

[57] ABSTRACT

This invention relates to a process for the production of a catalytic component for the polymerization of olefins, in particular, for the production of a catalytic component capable of exhibiting a high polymerization activity in the polymerization of olefins and giving a polymer containing less low molecular weight components in effective manner. This process is characterized by a process for the production of a catalytic component for the polymerization of olefins, which comprises contacting (a) metallic magnesium, (b) a halogenated hydrocarbon represented by the general formula RX wherein R is an alkyl group, ary group or cycloalkyl group having 1 to 20 carbon atoms and (c) a compound represented by the general formula $X^1_n M(OR^1)_{m-n}$ in which $X^1$ is a hydrogen atom, a halogen atom or a hydrocarbon group of 1 to 20 carbon atoms, M is boron, carbon, aluminum, silicon or phosphorus atom, $R^1$ is a hydrocarbon group of 1 to 20 carbon atoms, m is the atomic valence of M and $m > n \geq 0$ to obtain a magnesium-containing solid, contacting the magnesium-containing solid with (c) a halogen-containing alcohol and then contacting with (d) a titanium compound and (e) a solid halogenated hydrocarbon.

1 Claim, No Drawings

5,114,896

PROCESS FOR THE PRODUCTION OF A CATALYTIC COMPONENT FOR THE POLYMERIZATION OF OLEFINS

TECHNICAL FIELD OF THE INVENTION

This invention relates to a process for the production of a catalytic component for the polymerization of olefins.

TECHNICAL BACKGROUND

The so-called magnesium support type catalytic component for the polymerization of olefins, obtained by contacting a transition metal compound such as titaniium compound with a magnesium compound, has been known.

The inventors have proposed a catalytic component which is obtained by contacting metallic magnesium, a halogenated hydrocarbon and a compound represented by the general formula $X_n M(OR)_{m-n}$ to obtain a magnesium-containing solid and contacting the magnesium-containing solid with a halogen-containing alcohol and then with a titanium compound (Japanese Patent Laid-Open Publication No. 162703/1988). This catalytic component exhibits a high catalytic activity, but forms a polymer containing somewhat more low molecular weight components, causing a problem that fuming takes place during processing the polymer. Thus, as occasion demands, it is required to remove the low molecular weight components in the polymer before processing.

DISCLOSURE OF THE INVENTION

The inventors have made various studies on the provision of a catalytic component capable of producing an olefin polymer with less low molecular weight components in a high yield and consequently have found that the object of the present invention can be achieved by a catalytic component which is obtained by, in the process for the preparation of the catalytic component the inventors have proposed, contacting the contacted product with a halogen-containing alcohol with a titanium compound and solid halogenated hydrocarbon. The present invention is based on this finding.

That is to say, the gist of the present invention consists in a process for the production of a catalytic component for the polymerization of olefins, which comprises contacting (a) metallic magnesium, (b) a halogenated hydrocarbon represented by the general formula RX wherein R is an alkyl group, aryl group or cycloalkyl group having 1 to 20 carbon atoms and (c) a compound represented by the general formula $X^1_n M(OR^1)_{m-n}$ in which $X^1$ is a hydrogen atom, a halogen atom or a hydrocarbon group of 1 to 20 carbon atoms, M is boron, carbon, aluminum, silicon or phosphorus atom, $R^1$ is a hydrocarbon group of 1 to 20 carbon atoms, m is the atomic valence of M and $m > n \geq 0$ to obtain a magnesium-containing solid, contacting the magnesium-containing solid with (c) a halogen-containing alcohol and then contacting with (d) a titanium compound and (e) a solid halogenated hydrocarbon.

BEST EMBODIMENT FOR CARRYING OUT THE INVENTION

Raw Materials for Preparation of Catalytic Component (a) Metallic Magnesium

Any metallic magnesium can be used, but in particular, powdered and chipped ones are suitable. Before use, these metallic magnesiums are preferably washed with an inert hydrocarbon such as saturated aliphatic, alicyclic hydrocarbons or aromatic hydrocarbons of 6 to 8 carbon atoms and heated and dried in the presence of an inert gas such as nitrogen, etc.

(b) Halogenated Hydrocarbons

Preferably, the halogenated hydrocarbons represented by the general formula RX are chlorinated or brominated hydrocarbons wherein R is an alkyl group, aryl group or cycloalkyl group of 1 to 8 carbon atoms. Examples of such a halogenated hydrocarbon are methyl, ethyl, isopropyl, n-butyl, n-octyl and cyclohexyl chlorides and bromides, chlorobenzenes, o-chlorotoluene, etc.

(c) Compound of General Formula $X^1_n M(OR^1)_{m-n}$

In this formula, M, $X^1$, $R^1$, m and n have the same meaning as described above. $X^1$ may be a halogen-substituted hydrocarbon group of 1 to 20 carbon atoms. When $X^1$ is a hydrocarbon group, $X^1$ and $R^1$ may be same or different. Hereinafter, the compound of the above described general formula will be referred to as the alkoxy compound merely.

Examples of the hydrocarbon group are alkyl groups such as methyl, ethyl, propyl, i-propyl, butyl, amyl, hexyl, octyl, 2-ethylhexyl, decyl, etc., cycloalkyl groups such as cyclopentyl, cyclohexyl, methylcyclohexyl, etc., alkenyl groups such as allyl, propenyl, butenyl, etc., aryl groups such as phenyl, tolyl, xylyl, etc. and aralkyl groups such as phenethyl, 3-phenylpropyl, etc. Above all, alkyl groups of 1 to 10 carbon atoms are preferable.

Examples of the alkoxy group are given in the following.

(1) Compound when M is carbon $C(OR^1)_4$ such as $C(OCH_3)_4$, $C(OC_2H_5)_4$, $C(OC_3H_7)_4$, $C(OC_4H_9)_4$, $C(O-i-C_4H_9)_4$, $C(OC_6H_{13})_4$ and $C(OC_8H_{17})_4$; $X^1C(OR^1)_3$ such as $HC(OCH_3)$, $HC(OC_2H_5)_3$, $HC(OC_3H_7)_3$, $HC(OC_4H_9)_3$, $HC(O-i-C_4H_9)_3$, $HC(OC_6H_{13})_3$, $HC(OC_8H_{17})_3$, $HC(OC_6H_5)_3$, $CH_3C(OCH_3)_3$, $CH_3C(OC_2H_5)_3$, $C_2H_5C(OCH_3)_3$, $C_2H_5C(OC_2H_5)_3$, $C_6H_{11}C(OC_2H_5)_3$, $C_6H_5C(OCH_3)_3$, $C_6H_5C(OC_2H_5)_3$, $C_6H_5C(OC_3H_7)_3$, $C_7H_7C(OC_2H_5)_3$, $C_8H_9C(OC_2H_5)_3$, $CH_2BrC(OC_2H_5)_3$, $CH_2ClC(OC_2H_5)_3$, $CH_3CHBr(OC_2H_5)_3$, $CH_3CHClC(OC_2H_5)_3$, $ClC(OCH_3)_3$, $ClC(OC_2H_5)_3$, $ClC(OC_3H_7)_3$, $ClC(O-i-C_4H_9)_3$, $ClC(OC_8H_{17})_3$, $ClC(OC_6H_5)_3$ and $BrC(OC_2H_5)_3$; $X^1_2 C(OR^1)_2$ such as $CH_3CH(OCH_3)_2$, $CH_3CH(OC_2H_5)_2$, $CH_2(OCH_3)_2$, $CH_2(OC_2H_5)_2$, $CH_2ClCH(OC_2H_5)_2$, $CHCl_2CH(OC_2H_5)_2$, $CCl_3CH(OC_2H_5)_2$, $CH_2BrCH(OC_2H_5)_2$, $CH_2ICH(OC_2H_5)_2$ and $C_6H_5CH(OC_2H_5)_2$.

(2) Compound when M is silicon $Si(OR^1)_4$ such as $Si(OCH_3)_4$, $Si(OC_2H_5)_4$, $Si(OC_4H_9)_4$, $Si(O-i-C_4H_9)_4$, $Si(OC_6H_{13})_4$, $Si(OC_8H_{17})_4$, $Si[OCH_2CH(C_2H_5)C_4H_9]_4$ and $Si(OC_6H_5)_4$;

$X^1Si(OR^1)_3$ such as $HSi(OC_2H_5)_3$, $HSi(OC_4H_9)_3$, $HSi(OC_6H_{13})_3$, $HSi(OC_6H_5)_3$, $CH_3Si(OCH_3)_3$, $CH_3Si(OC_2H_5)_3$, $CH_3Si(OC_4H_9)_3$, $C_2H_5Si(OC_2H_5)_3$, $C_4H_9Si(OC_2H_5)_3$, $C_6H_5Si(OC_2H_5)_3$, $C_2H_5Si(OC_6H_5)_3$, $ClSi(OCH_3)_3$, $ClSi(OC_2H_5)_3$, $ClSi(OC_3H_7)_3$, $ClSi(OC_6H_5)_3$, and $BrSi(OC_2H_5)_3$; $X^1_2Si(OR^2)_2$ such as $(CH_3)_2Si(OCH_3)_2$, $(CH_3)_2Si(OC_2H_5)_2$, $(CH_3)_2Si(OC_3H_7)_2$, $(C_2H_5)_2Si(OC_2H_5)_2$, $(C_6H_5)_2Si(OC_2H_5)_2$, $CH_3ClSi(OC_2H_5)_2$, $CHCl_2SiH(OC_2H_5)_2$, $CCl_3SiH(OC_2H_5)_2$, $CH_3BrSi(OC_2H_5)_2$ and $CH_3ISiH(OC_2H_5)_2$; $X^1_3SiOR^1$ such as $(CH_3)_3SiOCH_3$, $(CH_3)_3SiOC_2H_5$, $(CH_3)_3SiOC_4H_9$, $(CH_3)_3SiOC_6H_5$, $(C_2H_5)_3SiOC_2H_5$ and $(C_6H_5)_3SiOC_2H_5$.

(3) Compound when M is boron $B(OR^1)_3$ such as $B(OC_2H_5)_3$, $B(OC_4H_9)_3$, $B(OC_6H_{13})_3$ and $B(OC_6H_5)_3$.

(4) Compound when M is aluminum $Al(OR^1)_3$ such as $Al(OCH_3)_3$, $Al(OC_2H_5)_3$, $Al(OC_3H_7)_3$, $Al(Oi-C_3H_7)_3$, $Al(OC_4H_9)_3$, $Al(Ot-C_4H_9)_3$, $Al(OC_6H_{13})_3$ and $Al(OC_6H_5)_3$.

(5) Compound when M is phosphorus $P(OR^1)_3$ such as $P(OCH_3)_3$, $P(OC_2H_5)_3$, $P(OC_4H_9)_3$, $P(OC_6H_{13})_3$ and $P(OC_6H_5)_3$.

(d) Halogen-containing Alcohol

The halogen-containing alcohol used in the present invention means such a compound that in a mono- or polyhydric alcohol having one or more hydroxyl groups in one molecule, any one or more hydrogen atoms other than the hydroxyl groups are substituted by halogen atoms. As the halogen atom, there are chlorine, bromine, iodine and fluorine atoms, but chlorine atom is preferable.

Examples of these compounds are 2-chloroethanol, 1-chloro-2-propanol, 3-chloro-1-propanol, 1-chloro-2-methyl-2-propanol, 4-chloro-1-butanol, 5-chloro-1-pentanol, 6-chloro-1-hexanol, 3-chloro-1,2-propane diol, 2-chlorocyclohexanol, 4-chlorobenzhydrol, (m,o,p)-chlorobenzyl alcohol, 4-chlorocatechol, 4-chloro-(m,o)-cresol, 6-chloro-(m,o)-cresol, 4-chloro-3,5-dimethylphenol, chlorohydroquinone, 2-benzyl-4-chlorophenol, 4-chloro-1-naphthol, (m,o,p)-chlorophenol, p-chloro-α-methyl benzyl alcohol, 2-chloro-4-phenylphenol, 6-chlorothymol, 4-chlororesorcin, 2-bromoethanol, 3-bromo-1-propanol, 1-bromo-2-propanol, 1-bromo-2-butanol, 2-bromo-p-cresol, 1-bromo-2-naphthol, 6-bromo-2-naphthol, (m,o,p)-bromophenol, 4-bromoresorcin, (m,o.p)-fluorophenol, p-iodophenol, 2,2,-dichloroethanol, 2,3-dichloro-1-propanol, 1,3-dichloro-2-propanol, 3-chloro-1-(α-chloromethyl)-1-propanol, 2,3-dibromo-1-propanol, 1,3-dibromo-2-propanol, 2,4-dibromophenol, 2,4-dibromo-1-naphthol, 2,2,2-trichloroethanol, 1,1,1-trichloro-2-propanol, β,β,β-trichloro-tert-butanol, 2,3,4-trichlorophenol, 2,4,5-trichlorophenol, 2,4,6-trichlorophenol, 2,4,6-tribromophenol, 2,3,5-tribromo-2-hydroxytoluene, 2,3,5-tribromo-4-hydroxytoluene, 2,2,2-trifluoroethanol, α,α,α-trifluoro-m-cresol, 2,4,6,-triiodophenol, 2,3,4,6-tetrachlorophenol, tetrachlorohydroquinone, tetrachlorobisphenol A, tetrabromobisphenol A, 2,2,3,3-tetrafluoro-1-propanol, 2,3,5,6-tetrafluorophenol and tetrafluororesorcin.

(e) Titanium Compound

The titanium compounds are 2-, 3- and 4-valent titanium compounds, illustrative of which are titanium tetrachloride, titanium tetrabromide, trichloroethoxytitanium, trichlorobutoxytitanium, dichlorodiethoxytitanium, dichlorodibutoxytitanium, dichlorodiphenoxytitanium, chlorotriethoxytitanium, chlorotributoxytitanium, tetrabutoxytitanium, titanium trichloride and the like. Above all, tetravalent titanium halides such as titanium tetrachloride, trichloroethoxytitanium, dichlorodibutoxytitanium, dichlorodiphenoxytitanium, etc. are preferable and titanium tetrachloride is most preferable.

(f) Solid Halogenated Hydrocarbons

The solid halogenated hydrocarbons are polyhalides of aliphatic hydrocarbons containing 2 or more carbon atoms, alicyclic hydrocarbons containing 3 or more carbon atoms and aromatic hydrocarbon atoms containing 6 or more carbon atoms. As the halogen, there are given chlorine, bromine, fluorine and iodine and particularly, chlorine is preferable. Generally, the solid halogenated hydrocarbons are used in the form of solutions in inert media described hereinafter as solvents.

Examples of the halogenated hydrocarbon are hexachloroethane, hexabromoethane, octachloropropane, 1,1,1,2,2-pentachloropropane, 1,3-dichloro-2,2-bis(-chloromethyl)propane, decabromodecane, 1,12-dichlorododecane, 1,12-dibromododecane; hexachlorocyclopropane, 3,4-dichloro-1,2,3,-4-tetramethylcyclobutene, octachlorocyclopentene, hexabromopropane, trans-1,4-dichlorocyclohexane, 1,3,5-trichlorocyclohexane, 3,4,5,6-tetrachlorocyclohexene, 1,2,3,4,5,6-hexachlorocyclohexane, 1,2,3,4,5,6-hexabromocyclohexane, 1,1,2,3,4,5,6-heptachlorocyclohexane, 1,2,3,4,5,-6,7,7-octachloro-1,3,5-cycloheptatriene, 2,3-dichlorobicyclo[2,2,2]-octane, 2,2-dichloroadamantane, 1,2,5,6,9,10-hexabromocyclododecane; 1,4-dichlorobenzene, 1,2,3-trichlorobenzene, 1,2,3,4-tetrachlorobenzene, pentachlorobenzne, hexachlorobenzene, hexabromobenzene, 1-chloro-4-(chlorometyl)-benzene, 1,2,3-trichloro-4-methylbenzene, 1,2,3,4-tetrchloro-5-methylbenzene, 1,3-dichloro-5-(dichloromethyl)-benzene, 1-chloro-2-(trichloro-methyl)benzene, pentachloromethylchlorobenzne, 1,2-dichloro-4,5-dimethylbenzene, 1,2,3-trichloro-4,5-dimethylbenzene, 1,2,3,4-tetrachloro-5,6-dimethylbenzene, 1,2-bis(chloromethyl)benzene, 1,2-dichloronaphthalene, 1-chloro-2-fluoronaphthalene, 1-chloro-2-iodonaphthalene, 1-bromo-2-chloronaphthalene, 1,2,3-trichloronaphthalene, 1,2,3,4-tetrachloronaphthalene, 1,2,3,4-tetrachloro-1,2,3,4-tetrahydronaphthalene, octachloronaphthalene, 3-chloro-2-chloromethyl-biphenyl, 1,1-dichloro-2,2-di(4-chlorophenyl)ethane, 1,1',2,2',3,3',4,4',5,5'-decachlorobi-2,4-cyclopentadiene-1-yl and the like.

Preparatrion of Catalytic Component

The catalytic component of the present invention can be obtained by contacting metallic magnesium, a halogenated hydrocarbon and an alkoxy compound, contacting the thus resulting magnesium-containing compound with a halogen-containing alcohol and then contacting with a titanium compound and a solid halogenated hydrocarbon.

(1) Contacting of Metallic Magnesium, Halogenated Hydrocarbon and Alkoxy Compound The contacting method of the 3 components are not particularly limited, but any conatcting method can be employed, i.e. ① a method comprising contacting simultaneously the 3 components, ② a method comprising previously contacting metallic magnesium with a halogenated hydrocarbon and contacting the resulting magnesium compound with the alkoxy compound, or contacting the alkoxy compound with a compound obtained by previously contacting them, known as the so-called Grignard reagents, represented by $ClMgCH_3$, $ClMgC_2H_5$, $ClMgC_3H_7$, $ClMgC_4H_9$, $ClMgiC_4H_9$, $ClMgC_6H_{13}$, $ClMgC_8H_{17}$, $BrMgC_2H_5$, $BrMgC_4H_9$, $BrMgi-C_4H_9$, $IMgC_4H_9$, $ClMgC_6H_5$, $BrMgC_6H_5$, etc., ③ a method comprising suspending metallic magnesium in a solution of the alkoxy compound and adding a slution of a halogenated hydrocarbon to the suspension, ④ a method comprising contacting the alkoxy compound with a halogenated hydrocarbon and then adding metallic magnesium thereto, etc.

In the above described contacts of the 3 components, a small amount of a Grignard reagent may be present in the reaction system.

The ratio of the alkoxy compound and metallic magnesium used is preferably in the range of at least 1, particularly 3 to 5 of $OR^1$ groups in the alkoxy compound per 1 atom of magnesium in the metallic magnesium. For example, in the case of the alkoxy compound represented by $X^1{}_2C(OR^1)_2$, it is preferable to use at least 0.5 mole, particularly 1.5 to 2.5 moles of the alkoxy compound per 1 gram atom of magnesium and in the case of the alkoxy compound represented by $X^1C(OR^1)_3$, it is preferable to use at least $\frac{1}{3}$ mole, particularly 1 to 5/3 moles. The halogenated hydrocarbon is preferably used in a proportion of 1 to 2 moles per 1 gram atom of magnesium.

The above described contacting reaction can be accomplished by stirring the mixture at a contacting temperature of 0° to 250° C., preferably 30° to 120° C. for a contacting time of 0.5 to 10 hours. This reaction can be carried out in the presence of an inert hydrocarbon used before for drying the metallic magnesium, such as aliphatic, alicyclic and aromatic hydrocarbons containing 6 to 8 carbon atoms, but in order to carry out the reaction effectively, it is preferably carried out in the presence of an ether, illustarative of which are diethyl ether, diisopropyl ether, dibutyl ether, diisobutyl ether, diisoamyl ether, di-2-ethyl hexyl ether, diallyl ether, diphenyl ether, anisole, etc.

From the purpose of promoting these reactions, iodine, alkyl iodides and inorganic halides such as calcium chloride, copper chloride, manganese chloride, hydrogen halides, etc. can be used.

The solid product prepared by the foregoing reaction can be washed with a suitable washing agent, for example, inert hydrocarbons described above prior to contacting with a halogen-containing alcohol.

(2) Contacting with Halogen-containing Alcohol

Contacting of the magnesium-containing solid obtained in the foregoing (1) with the halogen-containing alcohol can be carried out with agitation in the presence of an inert medium. As the inert medium, there can be used hydrocarbons such as pentane, hexane, heptane, octane, decane, cyclohexane, benzene, toluene, xylene and the like, and halogenated hydrocarbons such as 1,2-dichloroethane, 1,2-dichloropropane, carbon tetrachloride, butyl chloride, isoamyl chloride, bromobenzene, chlorobenzene and the like.

The contacting of the both is generally carried out at −20° C. to +150° C. for 0.1 to 100 hours. When the contacting is exothermic, they are gradually contacted at a low temperature at the beginning and after mixing of the whole amount is finished, the temperature is raised to continue the contacting.

The halogen-containing alcohol is in a proportion of 0.05 to 20 gram moles, preferably 0.1 to 10 gram moles per 1 gram atom of magnesium in the solid.

The solid product obtained as described above can be contacted with the above described inert medium before the subsequent contacting.

(3) Contacting With Titanium Compound and Solid Halogenated Hydrocarbon

Contacting of the solid material obtained in the above described (2) with a titanium compound and a solid halogenated hydrocarbon is carried by ① simultaneously contacting the solid material, titanium compound and solid halogenated hydrocarbon, ② first contacting the solid material and titanium compound and then contacting with the solid halogenated hydrocarbon or ③ first contacting the solid material and solid halogenated hydrocarbon and then contacting with the titanium compound.

The contacting of the solid material with the titanium compound and solid halogenated hydrocarbon is generally carried out with agitation in the presence of the above described inert medium at a temperature of 0° to 200° C., preferably 50° to 150° C. for 0.5 to 20 hours. The titanium compound is generally used in a proportion of at least 0.1 gram mole, preferably 1 to 50 gram mole per 1 gram atom of magnesium in the solid material and the solid halogenated hydrocarbon is generally used in a proportion of 0.01 to 10 gram moles, preferably 0.05 to 2 gram moles per 1 gram mole of magnedium in the solid material.

The contacting of the solid material with the titanium compound or titanium compound and solid halogenated hydrocarbon can be carried out two times or more in the same manner as described above. The foregoing contact product can if necessary be washed with an inert medium and then mixed and contacted with further the titanium compound or solid halogenated hydrocarbon (and the medium).

The catalyst component of the present invention can be prepared as described above, but if necessary, it can be washed with a hydrocarbon such as hexane, heptane, octane, cyclohexane, benzene, toluene, xylene, etc. and if necessary, it can further be dried.

The catalytic component can be contacted with an olefin in the presence of an organoaluminum compound so that it may contain the olefin polymer. As the organoaluminum compound, there are used those described hereinafter, whcich will be used in the polymerization of an olefin with the catalytic component of the present invention.

As the olefin, there are used, in addition to ethylene, α-olefins such as propylene, 1-butene, 1-hexene, 4-methyl-1-pentene and the like. Contacting with the olefin is preferably carried out in the presence of the foregoing inert medium, in general, at a temperature of at most 100° C., preferably −10° C. to +50° C. The quantity of the olefin polymer contained in the catalytic component is ordinarily 0.1 to 100 g per 1 g of the catalytic component. The contacting of the catalytic component and olefin can be carried out in the presence of a known electron-donating compound in addition to an aluminum compound. The catalytic component contacted with the olefin can if necessary be washed with the foregoing inert medium and further dried.

Polymerization Catalyst of Olefins

The catalyst component obtained in the present invention can be used as a catalyst for the homopolymerization of an olefin or copolymerization thereof with other olefins in combination with an organo compound of Group I to III metals of Periodic Table.

Organic Compound of Group I to III Metals

As the organo metal compound, there can be used organo compounds of lithium, magnesium, calcium, zinc and aluminum. Above all, organo aluminum compounds are preferably used.

As the organoaluminum compound, there are used those represented by the general formula $R_n AlX_{3-n}$ wherein R is an alkyl or aryl group, X is a halogen atom, alkoxy group or hydrogen atom and n is any numeral in the range of $1 \leq n \leq 3$, for example, alkylaluminum compounds containing 1 to 18 carbon atoms, preferably 2 to 6 carbon atoms, such as trialkylaluminum, dialkylaluminum monohalide, monoalkylaluminum dihalide, alkylaluminum sesquihalide, dialkylaluminum monoalkoxide and dialkylaluminum monohydride, mixtures or complex compounds thereof. Specifically, there are trialkyl aluminums such as trimethylaluminum, trtiethylaluminum, tripropylaluminum, triisobutylaluminum, trihexylaluminum, etc., dialkylaluminum monohalides such as dimethylaluminum chloride, diethylaluminum chloride, diethylaluminum bromide, diethylaluminum iodide, diisobutylaluminum chloride, etc., monoalkylaluminum dihalides such as methylaluminum dichloride, ethylaluminum dichloride, methylaluminum dibromide, ethylaluminum dibromie, ethylaluminum diiodide, isobutylaluminum dichloride, etc., alkylaluminum sesquihalides such as ethylaluminum sesquichloride, etc., dialkylaluminum monoalkoxides such as dimethylaluminum methoxide, diethylaluminum ethoxide, diethylaluminum phenoxide, dipropylaluminum ethoxide, diisbutylaluminum ethoxide, diisobutylaluminum phenoxide, etc. and dialkylaluminum hydrides such as dimethylaluminum hydride, diethylaluminum hydride, dipropylaluminum hydride, diisobutylaluminum hydride, etc. Above all, trialkylaluminums, particularly, triethylaluminum and triisobutylaluminum are preferable. These trialkylaluminums can be used jointly with other organoaluminum compounds, for example, commercially available diethylaluminum chloride, ethylaluminum dichloride, ethylaluminum sesquichloride, diethylaluminum ethoxide, diethylaluminum hydride or mixtures or complex compounds thereof.

Furthermore, such an organoaluminum compound that two or more aluminums are bonded via oxygen atom or nitrogen atom can be used, illustrative of which are $(C_2H_5)_2AlOAl(C_2H_5)_2$, $(C_4H_9)_2AlOAl(C_4H_9)_2$ and $(C_2H_5)_2AlNAl(C_2H_5)_2 C_2H_5$.

As organic compounds of other metals than aluminum metal, there are diethylmagnesium, ethylmagnesium chloride, diethylzinc and compounds such as $LiAl(C_2H_5)_4$, $LiAl(C_7H_{15})_4$, etc.

These organometal compounds can be used individually or in combination with an electron-donating compound.

As the electron donating compound, there are given carboxylic acids, carboxylic acid anhydride, carboxylic acid esters, carboxylic acid halides, alcohols, ethers, ketones, amines, amides, nitriles, aldehydes, alcoholate, phophorus, arsenic and antimony compounds bonded with organic groups through carbon or oxygen, phosphonamides, thioethers, thioesters, carbonic acid esters and the like.

In addition, electron-donating compounds comprising organosilicon compounds containing hydrocarbyloxy groups can be used, for example, tetraalkyloxysilane, tetraaryloxysilane, tetraaralkyloxysilane, alkyltrialkyloxysilane, alkyltriaryloxysilane, aryltrialkyloxysilane, aryltriaryloxysilane, dialkyldialkyloxysilane, dialkyldiaryloxysilane, diaryldialkyloxysilane, diaryldiaryloxysilane and the like.

These electron-donating compounds can be used individually or in combination. Furthermore, these electron-donating compounds can also be used when an organometal compound is used together with the catalytic component or after being previously contacted with an organometal compound.

The quantity of an organometal compound used for the catalyst component of the present invention is ordinarily 1 to 2,000 gram moles, in particular, 20 to 500 gram moles per 1 gram atom of titanium in the catalytic component.

The ratio of the organometal compound and electron-donating compound is 0.1 to 40, preferably 1 to 25 gram atoms, as aluminum, of the organometal compound to 1 mole of the electron-donating compound.

POLYMERIZATION OF OLEFINS

A catalyst consisting of the catalytic component obtained as described above and an organometal compound (and electron-donating compound) is useful for the homopolymerization of monoolefins containing 2 to 10 carbon atoms or for the copolymerization thereof with other monoolefins or diolefins containing 3 to 10 carbon atoms, and in particular, can exhibit very excellent properties in the homopolymerization of ethylene or the random or block copolymerization of ethylene with $\alpha$-olefins, in particular, containing 3 to 6 carbon atoms, for example, propylene, 1-butene, 4-methyl-1-pentene, 1-hexene, etc.

The polymerization reaction is carried out either in gaseous or liquid phase. In the case of the liquid phase, the polymerization is carried out in an inert hydrocarbon such as n-butane, i-butane, n-pentane, i-pentane, hexane, heptane, octane, cyclohexane, benzene, toluene or xylene or in a liquid monomer. The polymerization temperature is generally $-80°$ to $+150°$ C., preferably $40°$ to $120°$ C. and the polymerization pressure can be, for example, 1 to 60 atm. Control of the molecular weight of the resulting polymer is carried out in the presence of hydrogen or other known molecular weight regulating agents. In the copolymerization, the amount of other polyolefins to be copolymerized with olefin is generally at most 30% by weight, in particular, 0.3 to 15% by weight to the olefin. The polymerization reaction by the catalyst system according to the present invention can be carried out continuously or batchwise under the commonly used conditions. The copolymerization reaction can be carried out either in one or more stages.

ADVANTAGES OF THE INVENTION

The catalytic component obtained in the present invention exhibits a high activity in the polymerization of olefins and the resulting polymer contains less low molecular weight components.

EXAMPLES

The present invention will be illustrated specifically by the following examples and application examples, in which percents (%) are to be taken as those by weight unless otherwise indicated.

The melt index (MI) of a polymer was measured according to ASTM-D 1238. The cyclohexane-soluble content (hereinafter referred to as CHS) showing the proportion of a low molecular weight component in the polymer is a residual amount obtained by extracting the polymer with boiled cyclohexane by means of a Soxhlet extractor of improved type for 5 hours.

EXAMPLE 1

Preparation of Magnesium-containing Solid 8.2 g (0.33 mole) of chipped metallic magnesium (purity 99.5%, average grain diameter 1.6 mm) and 200 ml of n-hexane were charged in a reactor of 1000 ml equipped with a refluxing condenser in nitrogen atmosphere and stirred at 60° C. for 1 hour, after which the metallic magnesium was taken out and dried at 60° C. under reduced pressure, thus obtaining metallic magnesium, previously activated. This metallic magnesium was then suspended in 147 ml of di-n-butyl ether at 60° C., to which a mixed solution of 40.1 ml of n-butyl chloride and 53.3 ml of di-n-butyl ether was dropwise added. After the dropwise addition, the mixture was stirred at 70° C. for 1.5 hours.

55.4 ml (0.33 mole) of ethyl orthoformate HC(OC$_2$H$_5$)$_3$ was then dropwise added thereto at room temperature, subjected to gradual raising of the temperature to 80° C. and stirred at 80° C. for 2 hours. The thus obtained solid material was washed with 300 ml of n-hexane at 60° C. 6 times and dried at room temperature under reduced pressure for 1 hour, thus obtaining 30.8 g of a magnesium-containing solid (Solid A).

Contacting with 2,2,2-Trichloroethanol 7.5 g of the thus obtained Solid A and 60 ml of n-heptane were charged in a flask of 200 ml, to which 15.4 ml of a n-heptane solution containing 2.4 ml of 2,2,2-trichloroethanol was dropwise added at room temperature, followed by stirring at room temperature for further 1 hour. The resulting solid material was washed with 120 ml of n-heptane 4 times and with 120 ml of toluene 2 times at room temperature to obtain a solid material (Solid B)

Contacting with Titanium Tetrachloride and Hexachloroethane 22.4 ml of toluene and 22.8 ml of a toluene solution of hexachloroethane (0.43 ml/l) were added to Solid B obtained as described above and stirred at room temperature for 15 minutes. Titanium tetrachloride was then added so as to give a titanium tetrachloride/toluene volume ratio of 3/2 and heated to 95° C., followed by stirring for 2 hours. The resulting solid material was washed 6 times respectively with 120 ml of n-hexane at 85° C. and further subjected to drying under reduced pressure for 1 hour to obtain 8.1 g of a catalytic component containing 2.8% of titanium.

EXAMPLES 2 TO 7

Example 1 was repeated except using alkoxy compounds described below instead of HC(OC$_2$H$_5$)$_3$, thus obtaining catalytic components:

| Examples | Alkoxy Compounds |
| --- | --- |
| 2 | CH$_3$CH(OC$_2$H$_5$)$_2$ |
| 3 | C(OC$_2$H$_5$)$_4$ |
| 4 | Si(OC$_2$H$_5$)$_4$ |
| 5 | Al(OC$_2$H$_5$)$_3$ |
| 6 | B(OC$_2$H$_5$)$_3$ |
| 7 | P(OC$_2$H$_5$)$_3$ |

EXAMPLES 8 TO 11

Example 1 was repeated except using halogen-containing alcohols described below insted of 2,2,2-trichloroethanol, thus obtaining catalytic components:

| Examples | Halogen-containing Alcohols |
| --- | --- |
| 8 | 1,1,1-trichloro-2-propanol |
| 9 | 2,2-dichloroethanol |
| 10 | p-chlorophenol |
| 11 | 1-bromo-2-butanol |

EXAMPLES 12 TO 16

Example 1 was repeated except using halogenated hydrocarbons described below instead of hexachloroethane, thus obtaining catalytic components:

| Examples | Solid Halogenated Hydrocarbons |
| --- | --- |
| 12 | 1,2,3,4,5,6-hexachlorocyclohexane |
| 13 | 1,3-dichloro-2,2-bis(chloromethyl)-propane |
| 14 | hexachlorobenzene |
| 15 | pentachlorobenzene |
| 16 | pentachloromethylbenzene |

EXAMPLE 17

45.4 ml of toluene was added to Solid B obtained in an analogous manner to Example 1 and titanium tetrachloride was then added thereto to give a titanium tetrachloride/toluene volume ratio of 3/2, followed by raising the temperature to 95° C. and stirring for 2 hours. 22.8 ml of a toluene solution of hexachloroethane (0.43 ml/l) was then added thereto and stirred for 1 hour. Thereafter, the solid material was washed and dried in an analogous manner to Example 1, thus obtaining a catalytic component.

EXAMPLE 18

Example 17 was repeated except using 1,2,3,4,5,6-hexachlorocyclohexane instead of the hexachloroethane, thus obtaining a catalytic component.

EXAMPLE 19

22.6 ml of toluene was added to Solid B obtained in an analogous manner to Example 1 and 22.8 ml of a toluene solution of hexachloroethane (0.43 ml/l) was then added thereto, followed by raising the temperature to 95° C. and stirring for 1 hour. Then, titanium tetrachloride was added thereto to give a titanium tetrachloride/toluene volume ratio of 3/2 and stirred for 2 hours. Thereafter, the solid material was washed and dried in an analogous manner to Example 1, thus obtaining a catalytic component.

EXAMPLE 20

Example 19 was repeated except using 1,2,3,4,5,6-hexachlorocyclohexane instead of the hexachloroethane, thus obtaining a catalytic component.

COMPARATIVE EXAMPLE 1

Example 1 was repeated except using 22.8 ml of toluene instead of the toluene solution of hexachloroethane, thus obtaining a catalytic component.

COMPARATIVE EXAMPLE 2

Example 1 was repeated except using 1,2-dichloroethane instead of the hexachloroethane, thus obtaining a catalytic compomemt.

COMPARATIVE EXAMPLE 3

Example 17 was repeated except using 1,2-dichloroethane instead of the hexachloroethane, thus obtaining a catalytic compomemt.

APPLICATION EXAMPLE 1

Polymerization of Ethylene 10 mg of the catalytic component obtained in Example 1 and 0.7 ml of an n-heptane solution of triisobutylaluminum (1 mole/l) were charged in a nitrogen atmosphere in an autoclave of stainless steel of 1.5 l, equipped with a stirrer, into which 700 ml of liquid isobutane, 2 l of hydrogen gas as a molecular weight regulator and 3.3 l of ethylene gas were then introduced forcibly under pressure. In the reaction system heated to 70° C., polymerization of ethylene was carried out for 1 hour, during which ethylene gas was continuously fed so as to maintain constant the pressure inside the autoclave. After the polymerization, the unreacted gas and other gases were purged to obtain white polyethylene powder. The quantity of the polymer thus formed was 26.2 kg per 1 g of the catalytic component and the polymer had an MI of 3.2 g/10 min and CHS of 0.8%.

APPLICATION EXAMPLES 2 TO 23

Polymerization of ethylene was carried out in an analogous manner to Application Example 1 except using the catalytic components obtained in Examples 2 to 20 and Comparative Examples 1 to 3 instead of the catalytic component obtained in Example 1. The results are shown in Table 1.

TABLE 1

| Application Examples | Catalytic Component | Catalytic Activity (Kg/g · catalytic component) | MI (g/10 min) | CHS (%) |
|---|---|---|---|---|
| 1 | Example 1 | 26.2 | 3.2 | 0.8 |
| 2 | 2 | 23.5 | 3.5 | 1.1 |
| 3 | 3 | 18.2 | 2.8 | 1.1 |
| 4 | 4 | 12.1 | 3.3 | 0.9 |
| 5 | 5 | 15.1 | 4.1 | 1.2 |
| 6 | 6 | 18.0 | 4.3 | 1.0 |
| 7 | 7 | 16.2 | 2.8 | 1.1 |
| 8 | 8 | 19.7 | 3.1 | 1.3 |
| 9 | 9 | 21.0 | 2.9 | 1.2 |
| 10 | 10 | 19.1 | 3.3 | 1.3 |
| 11 | 11 | 23.0 | 4.1 | 1.4 |
| 12 | 12 | 25.0 | 3.0 | 1.0 |
| 13 | 13 | 23.7 | 3.3 | 0.9 |
| 14 | 14 | 24.1 | 2.9 | 1.0 |
| 15 | 15 | 23.1 | 2.6 | 1.2 |
| 16 | 16 | 24.5 | 3.5 | 1.1 |
| 17 | 17 | 23.0 | 2.8 | 1.1 |
| 18 | 18 | 22.5 | 3.3 | 1.0 |
| 19 | 19 | 24.0 | 2.7 | 1.1 |
| 20 | 20 | 23.5 | 3.2 | 1.2 |
| 21 | Comparative Example 1 | 25.0 | 2.3 | 1.8 |
| 22 | 2 | 25.5 | 2.8 | 1.6 |
| 23 | 3 | 16.0 | 3.1 | 1.7 |

UTILITY AND POSSIBILITY ON COMMERCIAL SCALE

The catalytic component obtained in the present invention largely serves to the industry because of having a higher polymerization activity in the polymerization of olefins and giving a polymer containing less low molecular weight components.

We claim:

1. A process for the production of a catalytic component for the polymerization of olefins, which comprises contacting (a) metallic magnesium, (b) a halogenated hydrocarbon represented by the general formula RX, wherein R is an alkyl group, aryl group or cycloalkyl group having 1 to 20 carbon atoms and (c) a compound represented by the general formula $X^1_n M(OR^1)_{m-n}$ in which $X^1$ is a hydrogen atom, a halogen atom or a hydrocarbon group of 1 to 20 carbon atoms, M is boron, carbon, aluminum, silicon or phosphorus atom, $R^1$ is a hydrocarbon group of 1 to 20 carbon atoms, m is the atomic valence of M and $m>n\geq 0$ to obtain a magnesium-containing solid, contacting the magnesium-containing solid with (c) a halogen-containing alcohol and then contacting with (d) a titanium compound and (e) a solid halogenated hydrocarbon.

* * * * *